US007247277B1

(12) United States Patent
Inoue et al.

(10) Patent No.: US 7,247,277 B1
(45) Date of Patent: Jul. 24, 2007

(54) AUTOMATIC SYNTHESIS MACHINE

(75) Inventors: Takaaki Inoue, Shiga-ken (JP); Yutaka Kuratani, Kanagawa-ken (JP); Kenichi Kitamura, Kanagawa-ken (JP)

(73) Assignee: Shimadzu Corporation, Nakagyo-ku (JP)

( * ) Notice: Subject to any disclaimer, the term of this patent is extended or adjusted under 35 U.S.C. 154(b) by 329 days.

(21) Appl. No.: 09/698,289

(22) Filed: Oct. 30, 2000

(51) Int. Cl.
*B01J 19/00* (2006.01)

(52) U.S. Cl. ............... 422/130; 422/102; 422/134; 700/266; 700/268; 702/31

(58) Field of Classification Search ............ 422/63–65, 422/67, 102, 131, 134; 436/43–45; 700/266, 700/268, 269, 95, 108; 702/19, 22, 31
See application file for complete search history.

(56) References Cited

U.S. PATENT DOCUMENTS

| | | | | |
|---|---|---|---|---|
| 3,391,275 A | * | 7/1968 | Bullock et al. | ............... 700/73 |
| 3,533,764 A | * | 10/1970 | Togneri | ........................... 48/61 |
| 4,303,973 A | * | 12/1981 | Williamson et al. | .......... 700/84 |
| 5,316,726 A | * | 5/1994 | Babson et al. | ................. 422/65 |
| 5,353,399 A | * | 10/1994 | Kuwamoto et al. | ......... 715/736 |
| 5,499,193 A | * | 3/1996 | Sugawara et al. | ........... 700/268 |
| 5,576,946 A | * | 11/1996 | Bender et al. | .................. 700/17 |
| 5,757,659 A | * | 5/1998 | Arai et al. | ...................... 702/22 |
| 6,044,212 A | * | 3/2000 | Flavin et al. | ................... 703/6 |
| 6,351,678 B1 | * | 2/2002 | Borders | ........................ 700/83 |
| 6,489,168 B1 | * | 12/2002 | Wang et al. | ................... 436/37 |
| 6,740,296 B1 | * | 5/2004 | Inoue | ......................... 422/106 |

FOREIGN PATENT DOCUMENTS

| | | | |
|---|---|---|---|
| JP | 2000093786 A | * | 4/2000 |
| JP | 2000117098 A | * | 4/2000 |

* cited by examiner

*Primary Examiner*—Jill Warden
*Assistant Examiner*—Dwayne Handy
(74) *Attorney, Agent, or Firm*—Westerman, Hattori, Daniels & Adrian, LLP.

(57) ABSTRACT

An automatic synthesis machine is used for synthesis of compounds using a plurality of vessels, allowing reagents to chemically react with each other. The automatic synthesis machine comprises a selection means for selecting a specific vessel among a plurality of vessels, a display device for displaying the vessel selected by the selection means in a manner such that it can be identified, together with the operation contents (suction and injection) related to the selected vessel, and an analysis means for analyzing a protocol prescribing a series of operational procedures for synthesis of compounds and picked-out commands related to the selected vessel from the protocol.

5 Claims, 15 Drawing Sheets

|   | 1 | 2 | 3 | 4 |
|---|---|---|---|---|
| A | 1 A<br>REAGENT 1a | 2 A<br>REAGENT 2a | 3 A<br>REAGENT 3a | 4 A |
| B | 1 B<br>REAGENT 1b | 2 B<br>REAGENT 2b | 3 B<br>REAGENT 3b | 4 B |
| C | 1 C<br>REAGENT 1c | 2 C<br>REAGENT 2c | 3 C<br>REAGENT 3c | 4 C |
| D | 1 D<br>REAGENT 1d | 2 D<br>REAGENT 2d | 3 D<br>REAGENT 3d | 4 D |

FIG. 10

PROTOCOL

| | |
|---|---|
| 1. | SUCTION OF REAGENT IN 1A FOR INJECTION INTO 2A |
| 2. | SUCTION OF REAGENT IN 1A FOR INJECTION INTO 2C |
| 3. | SUCTION OF REAGENT IN 1B FOR INJECTION INTO 2A |
| 4. | SUCTION OF REAGENT IN 1B FOR INJECTION INTO 2D |
| 5. | SUCTION OF REAGENT IN 1C FOR INJECTION INTO 2B |
| 6. | SUCTION OF REAGENT IN 1C FOR INJECTION INTO 2C |
| 7. | SUCTION OF REAGENT IN 1D FOR INJECTION INTO 2B |
| 8. | SUCTION OF REAGENT IN 1D FOR INJECTION INTO 2D |
| 9. | SUCTION OF REAGENT IN 1E FOR INJECTION INTO 4A |
| 10. | SUCTION OF REAGENT IN 1F FOR INJECTION INTO 4B |
| 11. | SUCTION OF SOLUTION IN 2A FOR INJECTION INTO 3A |
| 12. | SUCTION OF SOLUTION IN 2B FOR INJECTION INTO 3A |
| 13. | SUCTION OF SOLUTION IN 2C FOR INJECTION INTO 3B |
| 14. | SUCTION OF SOLUTION IN 2D FOR INJECTION INTO 3B |
| 15. | SUCTION OF SOLUTION IN 3A FOR INJECTION INTO 4A |
| 16. | SUCTION OF SOLUTION IN 3B FOR INJECTION INTO 4B |

FIG. 11

|   | 1 | 2 | 3 | 4 |
|---|---|---|---|---|
| A | 1 A REAGENT 1a | 2 A | 3 A | 4 A |
| B | 1 B REAGNET 1b | 2 B | 3 B | 4 B |
| C | 1 C REAGENT 1c | 2 C | 3 C | 4 C |
| D | 1 D REAGENT 1d | 2 D | 3 D | 4 D |
| E | 1 E REAGENT 1e | 2 D | 3 D | 4 D |
| F | 1 F REAGENT 1f | 2 D | 3 D | 4 D |

FIG. 12

|   | 1 | 2 | 3 | 4 |
|---|---|---|---|---|
| A | 1 A REAGENT 1a | 2 A | 3 A | 4 A |
| B | 1 B REAGENT 1b | 2 B | 3 B | 4 B |
| C | 1 C REAGENT 1c | 2 C | 3 C | 4 C |
| D | 1 D REAGENT 1d | 2 D | 3 D | 4 D |
| E | 1 E REAGENT 1e | 2 D | 3 D | 4 D |
| F | 1 F REAGENT 1f | 2 D | 3 D | 4 D |

FIG. 13

|   | 1 | 2 | 3 | 4 |
|---|---|---|---|---|
| A | 1 A REAGENT 1a | 2 A | 3 A | 4 A |
| B | 1 B REAGENT 1b | 2 B | 3 B | 4 B |
| C | 1 C REAGENT 1c | 2 C | 3 C | 4 C |
| D | 1 D REAGENT 1d | 2 D | 3 D | 4 D |
| E | 1 E REAGENT 1e | 2 D | 3 D | 4 D |
| F | 1 F REAGENT 1f | 2 D | 3 D | 4 D |

FIG. 14

|   | 1 | 2 | 3 | 4 |
|---|---|---|---|---|
| A | 1 A REAGENT 1a | 2 A | 3 A | 4 A |
| B | 1 B REAGENT 1b | 2 B | 3 B | 4 B |
| C | 1 C REAGENT 1c | 2 C | 3 C | 4 C |
| D | 1 D REAGENT 1d | 2 D | 3 D | 4 D |
| E | 1 E REAGENT 1e | 2 D | 3 D | 4 D |
| F | 1 F REAGENT 1f | 2 D | 3 D | 4 D |

FIG. 15

|   | 1 | 2 | 3 | 4 |
|---|---|---|---|---|
| A | 1 A REAGENT 1a | 2 A | 3 A | 4 A |
| B | 1 B REAGENT 1b | 2 B | 3 B | 4 B |
| C | 1 C REAGENT 1c | 2 C | 3 C | 4 C |
| D | 1 D REAGENT 1d | 2 D | 3 D | 4 D |
| E | 1 E REAGENT 1e | 2 D | 3 D | 4 D |
| F | 1 F REAGENT 1f | 2 D | 3 D | 4 D |

FIG. 16

|   | 1 | 2 | 3 | 4 |
|---|---|---|---|---|
| A | 1 A REAGENT 1a | 2 A | 3 A | 4 A |
| B | 1 B REAGENT 1b | 2 B | 3 B | 4 B |
| C | 1 C REAGENT 1c | 2 C | 3 C | 4 C |
| D | 1 D REAGENT 1d | 2 D | 3 D | 4 D |
| E | 1 E REAGENT 1e | 2 D | 3 D | 4 D |
| F | 1 F REAGENT 1f | 2 D | 3 D | 4 D |

FIG. 17

{IN SELECTION OF VESSEL 3A}

```
11. SUCTION OF SOLUTION IN 2A FOR INJECTION INTO 3A
12. SUCTION OF SOLUTION IN 2B FOR INJECTION INTO 3A
15. SUCTION OF SOLUTION IN 3A FOR INJECTION INTO 4A
```

FIG. 18

{IN SELECTION OF VESSEL 3B}

```
13. SUCTION OF SOLUTION IN 2C FOR INJECTION INTO 3B
14. SUCTION OF SOLUTION IN 2D FOR INJECTION INTO 3B
15. SUCTION OF SOLUTION IN 3B FOR INJECTION INTO 4A
```

FIG. 19

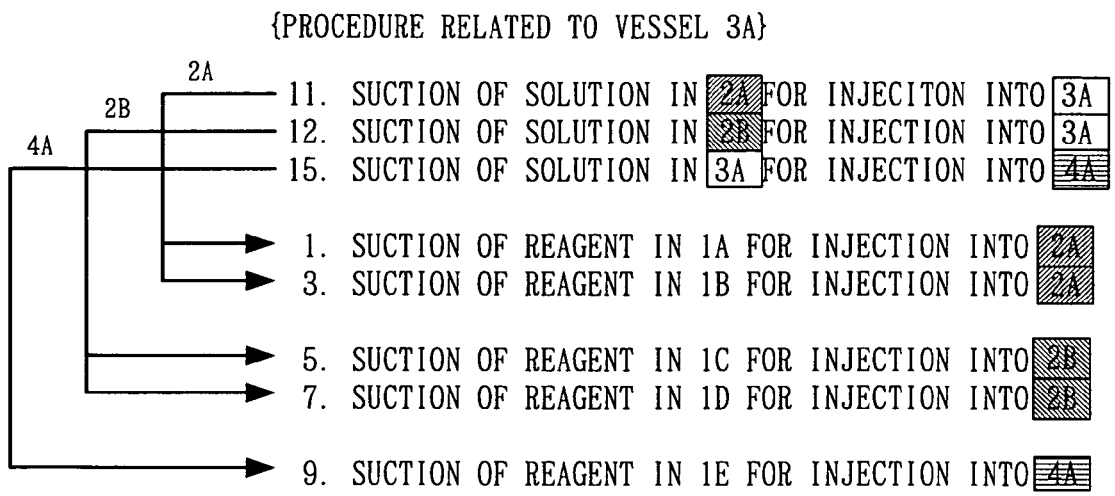

{PROCEDURE RELATED TO VESSEL 3A}

FIG. 20

OPERATIONAL PROCEDURE RELATED TO VESSEL 3A

```
 1. SUCTION OF REAGENT  IN 1A FOR INJECTION INTO 2A
 3. SUCTION OF REAGENT  IN 1B FOR INJECTION INTO 2A
 5. SUCTION OF REAGENT  IN 1C FOR INJECTION INTO 2B
 7. SUCTION OF REAGENT  IN 1D FOR INJECTION INTO 2B
 9. SUCTION OF REAGENT  IN 1E FOR INJECTION INTO 4A
11. SUCTION OF SOLUTION IN 2A FOR INJECTION INTO 3A
12. SUCTION OF SOLUTION IN 2B FOR INJECTION INTO 3A
15. SUCTION OF SOLUTION IN 3A FOR INJECTION INTO 4A
```

FIG. 21

|   | 1 | 2 | 3 | 4 |
|---|---|---|---|---|
| A | 1 A<br>REAGENT 1a | 2 A<br>REAGENT 2a | 3 A | 4 A |
| B | 1 B<br>REAGENT 1b | 2 B<br>REAGENT 2b | 3 B | 4 B |
| C | 1 C<br>REAGENT 1c | 2 C<br>REAGENT 2c | 3 C | 4 C |
| D | 1 D<br>REAGENT 1d | 2 D<br>REAGENT 2d | 3 D | 4 D |
| E | 1 E<br>REAGENT 1e | 2 E<br>REAGENT 2e | 3 E | 4 E |
| F | 1 F<br>REAGENT 1f | 2 F<br>REAGENT 2f | 3 F | 4 F |

FIG. 22

|   | 1 | 2 | 3 | 4 |
|---|---|---|---|---|
| A | 1 A | 2 A | 3 A | 4 A |
| B | 1 B | 2 B | 3 B | 4 B |
| C | 1 C | 2 C | 3 C | 4 C |
| D | 1 D | 2 D<br>REAGENT 2d | 3 D<br>REAGENT 3d | 4 D |
| E | 1 E | 2 E<br>REAGENT 2e | 3 E<br>REAGENT 3e | 4 E |
| F | 1 F | 2 F<br>REAGENT 2f | 3 F<br>REAGENT 3f | 4 F |

VESSEL ARRAY FOR STORAGE OF REAGENTS

VESSEL ARRAY FOR REACTION

AUTOMATIC SYNTHESIS MACHINE

BACKGROUND OF THE INVENTION

1. Field of the Invention

This invention relates to an automatic synthesis machine for automatic synthesis of compounds and, more particularly, to an automatic synthesis machine suitable for creation and analysis of a protocol prescribing the procedure of synthesis.

2. Description of the Prior Art

In the fields of studies on pharmacy, life science, chemistry and materials or the like, synthesis of a plurality of compounds is performed experimentally for determination of the characteristics and synthesis conditions or the like of compounds. An automatic synthesis machine is well known as a device for the synthesis of compounds. The automatic synthesis machine has a plurality of reactors, and a product resulting from synthesis in each reactor is recovered for every reactor.

Setting the chemical synthesis procedure called a protocol, the synthesis of compounds is performed by the automatic synthesis machine using a reagent and a solvent according to the protocol. In creation of the protocol, there is a need to specify vessels, together with operations (suction and injection) related to the specific vessels. The vessels are specified by assigning designations to specify the vessels on a vessel basis for making an entry of the designations in the protocol. As a result, there is a problem in that a long time is required for creation of the protocol. In particular, synthesis requiring the complicated procedure where a wide variety of reagents and solvents are used results in an increase in number of characters (the number of characters in an individual line) of one protocol or number of protocol lines.

Further, since a protocol is a kind of a program prescribing a procedure of synthesis and is written in only characters, it is difficult to specify vessels and also to ascertain the operation contents related to the specific vessels. In particular, in case where the procedure is complicated as a wide variety of reagents and solvents are used, the operation contents related to the specific vessels are hard to be ascertained only from the protocol.

Furthermore, in an automatic synthesis machine, synthesis of a wide variety of compounds is required at a time in some cases. In the prior art, synthesis of a wide variety of compounds would need a reaction rack formed by arraying a plurality of vessels for storage of reagents, solvents and products resulting from synthesis in the shape of a matrix with rows and columns, and there is also a need for creation of a synthesis protocol prescribing the vessels and the operations (suction and injection) related to the vessels according to the procedure of synthesis.

In a protocol for use in a synthesis carried out by an automatic synthesis machine in the prior art, the procedure of the synthesis is prescribed by specifying a vessel and also specifying to the specified vessel an operations such as suction or injection of a reagent, solvent, product or the like. Thus, according to the above protocol, although it is possible to ascertain a series of synthesis procedures, the problem with the above protocol is that it is not possible to easily ascertain and verify the process of chemical reaction on inspection in vessel units. Accordingly, for ascertaining an operation for every vessel, a person who creates a protocol has to interpret the protocol for verification after construction of chemical reactions for every vessel.

OBJECTS AND SUMMARY OF THE INVENTION

It is a primary object of the present invention to permit vessels in an automatic synthesis machine to be specified easily in creation of a protocol and also the operation contents related to the specific vessels to be ascertained easily.

Another object of the present invention is to permit the procedure of synthesis related to each vessel, prescribed in a protocol executed by an automatic synthesis machine, to be ascertained and verified easily.

According to the first mode of the present invention for attaining the above object, vessels in a reactor are displayed on a screen for selection of specific vessels among the vessels displayed on the screen, thereby permitting the vessels to be easily specified in creation of the protocol. Also, the vessels in the reactor are displayed on the screen together with the operation contents related to the specific vessels, thereby permitting the operation contents related to the specific vessels to be ascertained easily in creation of the protocol.

Further, the operations of selecting the vessels and specifying the operation contents are allowed to cooperate with creation of the protocol, thereby permitting the protocol to be created easily.

An automatic synthesis machine according to the first mode of the present invention comprises a display device for displaying at least a part of vessels housed in a reactor, and a selection means for selecting one or more vessels among the vessels displayed on a screen of the display device. The above configuration permits the vessels to be specified easily by displaying the vessels in the reactor on the screen for selection of the specific vessels among the vessels displayed on the screen.

The display device displays all or a part of vessels housed in the reactor on the screen, and each vessel can be displayed so that it can be identified on the screen. On the display screen, the selected vessels may be displayed so that it is distinguished from the other vessels by varying a display form such as a difference in density, patterns and framing.

Incidentally, the array of vessels displayed on the display device does not have to agree with the actual array of vessels in the reactor, and any other desired arrays are available if a correspondence to the vessels in the reactor is clear.

The number of vessels to be selected on the screen may be set to one or more. In selection of a plurality of vessels among the vessels arrayed in the shape of a lattice with rows and columns, selection of vessels on a row or column basis, including a plurality of rows and columns, or on a block basis composed of adjacent vessels is applicable. Further, selection of all the vessels displayed on the display screen is permitted.

According to a first mode of selecting vessels on the display device, vessels are specified on the display screen. In this mode, it is possible to specify an individual vessel, vessels in rows or columns and vessels in blocks as described above. According to a second mode of selecting vessels on the display device, an entry of vessels is made in the protocol line in process of creation.

In the creation of a protocol, a code assigned to each vessel can be used to specify the vessels. According to a first mode of specification of vessels by codes among the vessels arrayed in the shape of a lattice with rows and columns, a vessel is specified by specifying the row and column intersecting each other at the vessel to be specified. According to a second mode of specification of vessels by codes, a vessel is specified by a code which was assigned to each vessel in advance.

A protocol can be created using a display screen, so that the vessels specified on the display screen can be described in the protocol line in process of creation, or the vessels described in the protocol line in process of creation can be displayed on the display screen.

Further, in the automatic synthesis machine according to the first mode of the present invention, the vessels selected by the vessel selection means and the operation contents related to the selected vessels are displayed in a manner such that they can be identified on the screen of the display device. As a result, an operator can ascertain the operation contents related to the selected vessels easily.

The operation contents include an operation such as sucking up of a reagent or solvent from a vessel or injecting of the sucked-up reagent and solvent into the other vessels or the like. The display device may display the selected vessels in colors which correspond to the operation contents so that the operation contents can be discriminated. Further, the display device may also display the operation contents in a manner such that they can be discriminated by any other displaying features than colors so that the operation contents can be discriminated.

According to a first mode of selection of operation contents in the display device, vessels are specified on the display screen, and operation contents are selected on the display screen. Such selection of operation contents can be done by specifying an area for selecting the set operation contents on the display screen or by carrying out a specific operation for the selected vessels on the display screen. According to a second mode of selection of operation contents in the display device, the operation contents are described in the protocol line in process of creation.

A protocol can be created using a display screen, so that operation contents selected on the display screen can be described in the protocol line in process of creation, or the operation contents described in the protocol line in process of creation can be displayed on the display screen.

According to the first mode of the present invention, the vessels may be easily specified on the display screen and on the protocol line in process of creation, permitting the protocol to be created easily. Further, the operation contents related to the selected vessels may be easily ascertained on the display screen and on the protocol line in process of creation, also permitting the protocol to be created easily.

A protocol can be created using a display screen, so that the vessels and operation contents selected on the display screen can be described in the protocol line in process of creation, or the vessels and operation contents described in the protocol line in process of creation can be selected for display on the display screen.

According to the second mode of the present invention for attaining the above second object, a portion related to specific vessels can be picked out from a protocol which prescribes a compound synthesis procedure, when synthesizing compounds using the vessels, permitting an operator to easily ascertain and verify the procedure of synthesis required for the specific vessel.

The automatic synthesis machine according to the second mode of the present invention produces a compound resulting from synthesis by causing reagents to react chemically to each other, and comprises a plurality of vessels used for the synthesis of compounds, a selection means for selecting a specific vessel among a plurality of vessels, and an analysis means for analyzing a protocol prescribing a series of commands defining the procedure of synthesis of compounds to pick out the operation contents related to the selected vessel from the protocol. With the above configuration, the procedure of chemical synthesis related to the specific vessel in the protocol can be easily ascertained and verified.

The automatic synthesis machine according to the second mode of the present invention applies a plurality of vessels to synthesis of compounds, and the procedure of synthesis of compounds is defined by the series of commands (i.e., the protocol) prescribing the sequence and conditions of chemical reaction. With the automatic synthesis machine, the operations of suction and injection of the reagents, solvents and products stored in the specified vessels are carried out according to the procedure prescribed in the protocol.

The vessels are for storage of reagents and solvents used for synthesis and products including an intermediate product produced in process of synthesis and a final product or the like. The protocol prescribes the vessels required for the operations of suction and injection according to the reaction process and also the operations of suction and injection or the like related to the required vessels.

The vessel selection means is for selection of a specific vessel among a plurality of vessels so as to pick out a command related to the specific vessel from a series of commands in the protocol. The number of vessels to be selected may be set to one or more.

According to one mode of selection of a vessel with the vessel selection means, vessel selection is carried out by specifying a desired vessel among a plurality of vessels displayed on the screen of the display device. According to another mode of selection of the vessel with the vessel selection means, vessel selection is carried out by specifying a code assigned to a vessel to be selected. In selection of the vessel by codes among the vessels arrayed in the shape of a lattice with rows and columns, the vessel may be specified based on the row and column intersecting each other at the specific vessel or a code assigned to each vessel in advance.

According to still another mode of selection of a vessel with the vessel selection means, vessel selection is carried out by specifying a command in which a vessel to be selected is included in a protocol.

The display device displays all or a part of the vessels housed in a reactor on the screen. Each vessel may be displayed in a manner such that it can be identified on the screen. On the display screen, the selected vessels may be displayed in a manner such that they can be distinguished from the other vessels by varying a display form such as a difference in density, patterns and framing.

The array of vessels displayed on the display device does not have to agree with the actual array of vessels in a synthetic reaction device, and any other desired arrays are available as long as they have a clear correspondence with respect to the vessels in the synthetic reaction device.

The analysis means analyzes the protocol for picking out the command related to the selected vessel from a series of commands prescribed in the protocol. With the analysis, all the operations related to the specific vessel are picked out from the protocol, so that the operator can ascertain and verify the procedure of chemical synthesis based on the specific vessel.

Further, the analysis means may have a function of picking out all the vessels which concern with the operation related to the selected vessel. This function permits the operator to ascertain and verify the series of operational procedures related to the selected vessel.

Furthermore, the analysis means may have a function of modifying a part of protocol to be modified when found in the protocol by ascertainment and verification.

The result of analysis by the analysis means may be displayed on the screen of the display device in the mode of individually displaying the result of analysis for each selected vessel, or displaying in a lump the result of analysis for all the vessels.

BRIEF DESCRIPTION OF THE DRAWINGS

The foregoing and other objects and features of the invention will become apparent from the following description of preferred embodiments of the invention with reference to the accompanying drawings, in which:

FIG. 10 is a view of one example of a protocol;

FIG. 11 is a view of a vessel display screen showing the process carried out in vessels for suction and injection of reagents in case of producing a compound in a vessel 4A;

FIG. 12 is a view of the vessel display screen showing the process carried out in vessels for suction and injection of reagents in case of producing a compound in the vessel 4A;

FIG. 13 is a view of the vessel display screen showing the process carried out in vessels for suction and injection of reagents in case of producing a compound in a vessel 4B;

FIG. 14 is a view of the vessel display screen showing the process carried out in vessels for suction and injection of reagents in case of producing a compound in the vessel 4B;

FIG. 15 is a view of the vessel display screen showing one embodiment of display on the screen to ascertain and verify the procedure of chemical synthesis related to a vessel 3A;

FIG. 16 is a view of the vessel display screen showing one embodiment of display on the screen to ascertain and verify the procedure of chemical synthesis related to the vessel 3B;

FIG. 17 is a view showing one embodiment to ascertain and verify the procedure of chemical synthesis related to the vessel 3A;

FIG. 18 is a view showing one embodiment to ascertain and verify the procedure of chemical synthesis related to the vessel 3B;

FIG. 19 is a view showing all operations related to the selected vessel 3A;

FIG. 20 is a view showing the result of picking-out of all lines related to the selected vessel 3A from the protocol shown in FIG. 10;

FIG. 21 is a view of the vessel display screen showing one embodiment of storing reagents in a plurality of vessels in the specified block, respectively;

FIG. 22 is a view of the vessel display screen showing another embodiment of storing reagents in a plurality of vessels in the specified block, respectively.

DETAILED DESCRIPTION OF THE PREFERRED EMBODIMENTS

First Embodiment

A description will now be given of the first embodiment of the present invention with reference to FIGS. 1 to 7.

Figure 1:
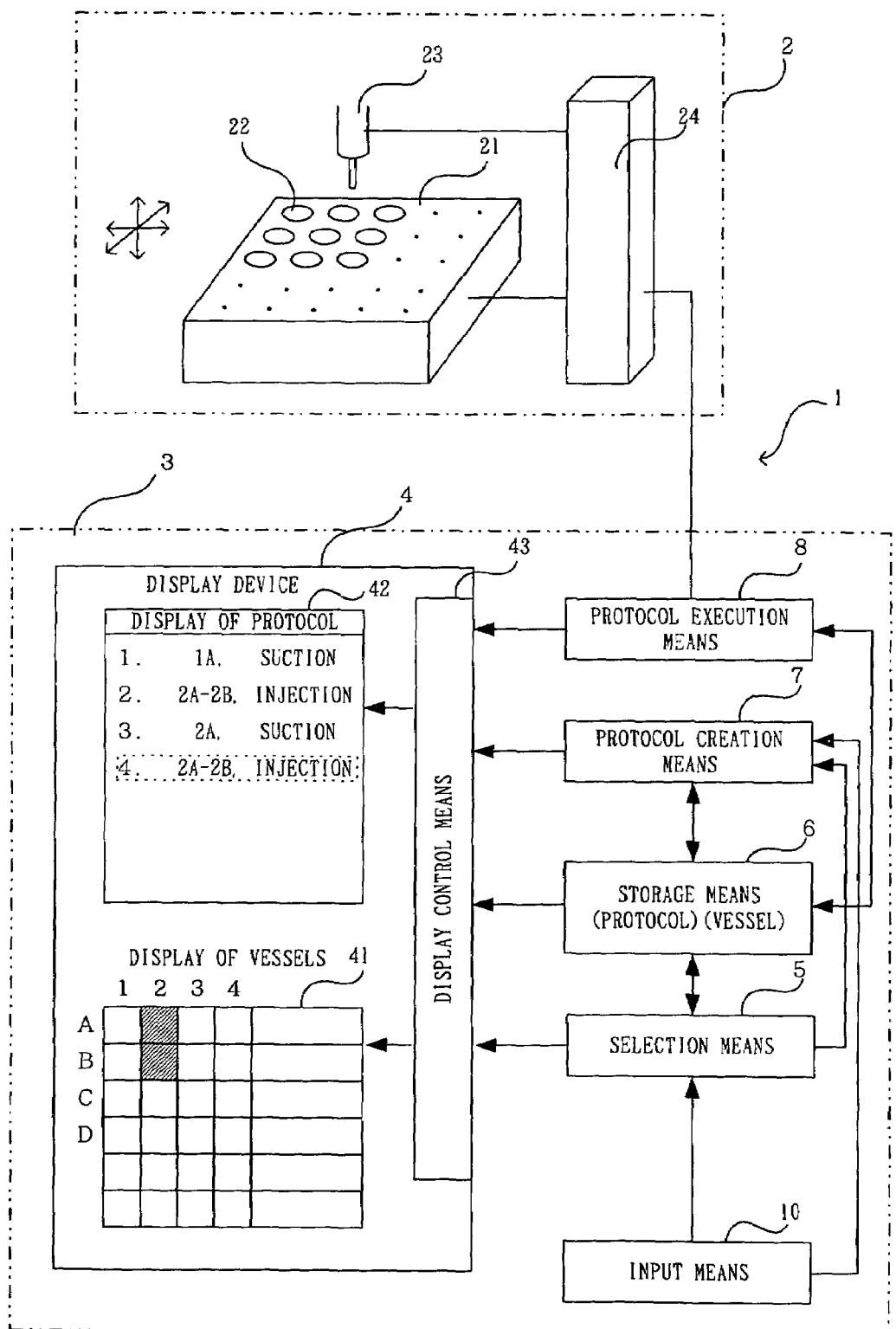
FIG. 1 is a view showing the outline of the first embodiment of an automatic synthesis machine according to the present invention.

FIG. 1 is a view showing an outline of configuration of an automatic synthesis machine according to the first embodiment of the present invention. In FIG. 1, an automatic synthesis machine 1 comprises a synthetic reaction device 2 for synthetic reaction and a control device 3. The synthetic reaction device 2 has a reactor 21 formed in the shape of a rack, a reaction block or the like, vessels 22 housed in the reactor 21, a suction/injection means 23 for suction and injection of a reagent, a solvent or a reactive solution, and a drive control means 24 for moving the reactor 21 and the suction/injection means 23 relatively to each other.

The suction/injection means 23 carries out suction of the reagent, the solvent, the reactive solution or the like from the vessels 22 and also injection of the sucked-up solution into another vessel according to a protocol (the procedure of reaction) for a predetermined chemical reaction to produce a desired synthetic product.

The control device 3 causes the synthetic reaction device 2 to carry out the synthesis process according to the protocol and also performs creation of the protocol. The control device 3 has a display device 4, a vessel selection means 5, a storage means 6, a protocol creation means 7, a protocol execution means 8 and an input means 10.

The display device 4 has a vessel display screen 41, a protocol display screen 42 and a display control means 43 for control of display on both the display screens.

The vessel display screen 41 is for displaying all or specific part of the vessels 22 housed in the reactor 21 of the synthetic reaction device 2. When the vessels 22 are arrayed in the shape of a lattice in the reactor 21, it is possible to specify the vessels by rows and columns. In FIG. 1, the rows of vessels are shown by alphabetic characters A, B, C, D, . . . , while the columns of vessels are shown by numerals 1, 2, 3, 4, . . . .

The array of vessels displayed on the vessel display screen 41 does not have to agree with the actual array of vessels 22 housed in the reactor 21, and any other desired arrays are available as long as they have a correspondence with respect to the vessels 22 in the reactor 21 which can easily be recognized.

By displaying only the vessels required for creation of a protocol on the vessel display screen 41 among the vessels 22 of the reactor 21, displaying of unnecessary vessels are eliminated, allowing the vessels to be identified easily.

A line descriptive of a vessel for which an operation is carried out and the content of the operation related to the vessel is displayed in order on the protocol display screen 42. The first line of the protocol in an example shown in FIG. 1 shows a command to carry out suction of a reagent in the vessel 1A at the intersection of the A-th row and the first column, and the second line of the protocol shows a command to carry out injection of reagents in the vessels 2A, 2B at the intersections of the A-th and B-th rows and the second column.

The display control means 43 is for carrying out display control of the vessel display screen 41 and the protocol display screen 42 based on data sent from the vessel selection means 5, the protocol creation means 7, the storage means 6 and the protocol execution means 8 described later.

The vessel selection means 5 is for performing selection of vessels on the vessel display screen 41 based on input data from the input means 10 or data from the protocol creation means 7. Incidentally, the input means 10 may include a keyboard, a mouse, a digitizer, a tablet, a track ball, a joy stick or like pointing device.

Various types of modes may be applied to selection of vessels on the vessel display screen 41. For instance, selection of vessels on a unit basis, on a row or rows basis, or column or columns basis, and on a block basis composed of a plurality of adjacent vessels is applicable, as well as selection of all the vessels.

In case of selection of vessels based on the input data from the input means 10, selection of one vessel is carried out by specifying a vessel among the vessels displayed on the vessel display screen 41 by operation of the input means 10. Selection of vessels in a row or a column is carried out by specifying the row or the column among the rows or columns displayed on the vessel display screen 41 by operation of the input means 10. Selection of vessels in blocks is carried out by selecting a specific block of vessels among the vessels displayed on the vessel display screen 41 by operation of the input means 10. The specification of a block for selection of vessels may be carried out using the pointing device or by specification of the rows and columns.

Also, selection of all the vessels can be carried out by extending the range of selection of rows, columns or blocks to all the displayed vessels or by selecting an area for selection of all the vessels. Incidentally, the area for selection of all the vessels may be provided on the vessel display screen 41 or on the side of the input means or may be provided by setting a specific code and so on.

In selection of vessels based on data from the protocol creation means 7, the vessels set in creation of the protocol by the protocol creation means 7 are selected. The vessel selection means 5 receives vessel data set by the protocol creation means 7, and then displays the vessels on the vessel display screen 41 based on the data received.

The protocol creation means 7 performs the creation of the protocol and then displays the created protocol lines on the protocol display screen 42. The process of creation of the protocol may be carried out by inputting a vessel and the operation contents related to the vessels by key inputting through the input means 10 or by inputting through the pointing device of the input means 10 on the vessel display screen 41. The created protocol is stored in the storage means 6. Incidentally, in this case, an area for selection of the operation contents may be provided on the vessel display screen 41.

The selection means 5 causes the vessels described in the protocol lines on the protocol display screen 42 to be displayed on the vessel display screen 41. The vessel display screen 41 of FIG. 1 shows that the vessels 2A, 2B described in the fourth protocol line are selected.

The operation contents related to the selected vessels are displayed on the vessel display screen 41, together with the selected vessels. On the vessel display screen 41, the selected vessels and the operation contents related to the selected vessels may be displayed in a manner such that they can be identified by varying a display form such as a difference in density, patterns, framing and colors.

The protocol execution means 8, reading out the protocol stored in the storage means 6 in sequence, sends the read-out protocol to the drive control means 24. The drive control means 24 drives the reactor 21 and the suction/injection means 23 according to the sent protocol and carries out a predetermined operations for synthesis using the reagents and solvents or the like. With the operation of the protocol execution means 8, the protocol may be displayed on the protocol display screen 42, and besides, the protocol line in process of execution may be displayed so that it can be identified. At the same time, the vessels and the operation contents related to the vessels in the protocol line in process of execution may be displayed on the vessel display screen 41.

Incidentally, data prescribing the layout of the vessel display screen 41 and the protocol display screen 42 may be stored in advance in a memory in the display control means 43 or the storage means 6.

A description will now be given of the vessel display screen 41 and its operation with reference to FIGS. 2 to 7.

Figures 2, 3:
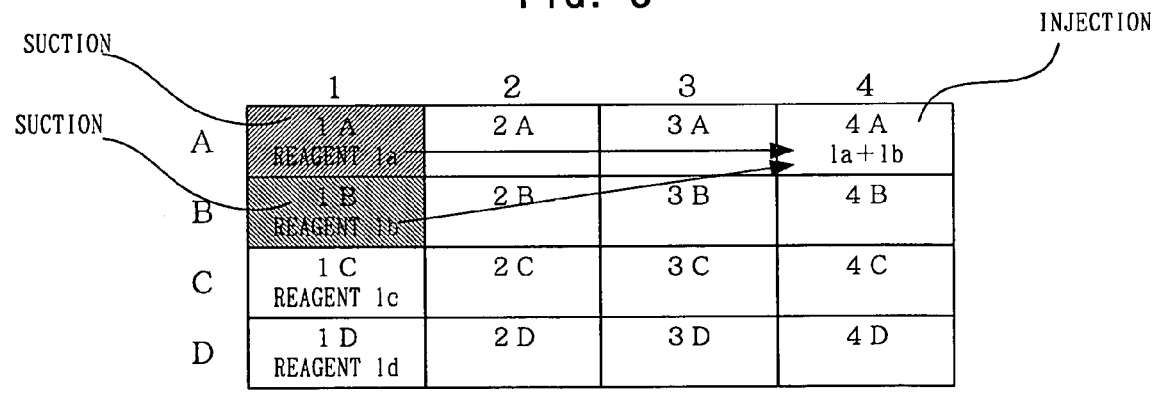
FIG. 2 is a view showing one instance of a vessel display screen of a display device of the automatic synthesis machine shown in FIG. 1.
FIG. 3 is a view showing the vessel display screen in case of selecting two vessels to carry out suction of reagents therein for injection into another vessel.

FIG. 2 shows one instance of the vessel display screen 41. In FIG. 2, the vessels arrayed in the shape of a lattice with four rows A, B, C and D in the vertical direction and four columns 1, 2, 3 and 4 in the horizontal direction are shown. Each vessel may be specified in terms of the row and column. For instance, the vessel in the top left-hand corner of FIG. 2 is specified as 1A, while the vessel in the bottom right-hand corner of FIG. 2 is specified as 4D.

A description will now be given of a case where the reagents 1*a*. 1*b*, . . . 3*c*, 3*d* are stored in the vessels 1A, 1B, 3C, 3D in the first to third rows, while the vessels 4A, . . . , 4D in the fourth row contain nothing, for the sake of convenience.

FIG. 3 shows the vessel display screen in case of selecting two vessels to carry out suction of reagents therein for injection into another vessel. First, selection of the vessels 1A, 1B is performed on the vessel display screen 41 for suction of the reagents 1*a*, 1*b* from the selected vessels 1A, 1B. The vessel display screen 41 shows the selection of the vessels 1A, 1B by displaying them in a form such that they can be distinguished from the other. The vessel display screen 41 may show the operation contents related to the selected vessels by attaching to the displayed vessels specific indication such as a color or a mark corresponding to the operation of suction.

Subsequently, injection of the reagents 1*a*, 1*b*, sucked up from the selected vessels 1A, 1B, into the empty vessel 4A is performed. The vessel display screen 41 shows the selection of the vessel 4A by displaying the selected vessel 4A in a manner such that it can be distinguished from the other. The vessel display screen 41 may show the selection of the operation content related to the selected vessel by attaching to the vessel displayed a specific indication such as a color or a mark corresponding to the operation of injection.

Incidentally, the specific indication given to the selected vessel may also be used for specific indication of the operation contents.

FIG. 3 shows a vessel display screen in case of displaying the operations of suction and injection simultaneously. By displaying predetermined related operations on the vessel display screen 41 simultaneously in creation of the protocol, the vessel and the operation content related to the vessel can be easily ascertained.

Figure 4A:
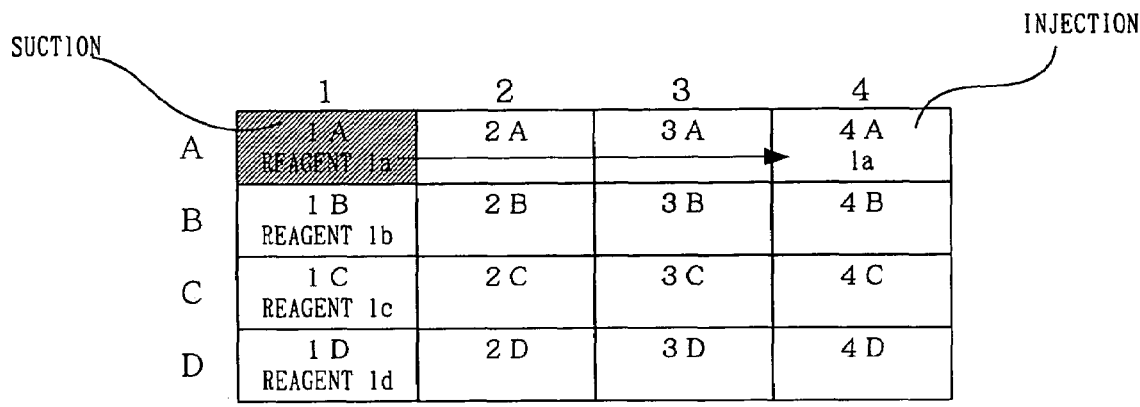
FIGS. 4A and 4B are views showing the vessel display screen in case of displaying a protocol execution state respectively.
Figure 4B:
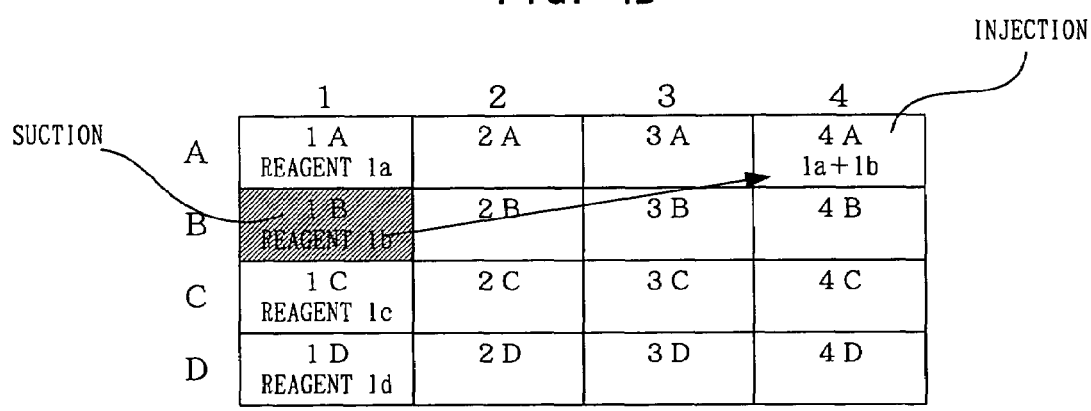

A description will now be given of the case of displaying the state of execution of the protocol shown in FIG. 3 in sequence on the vessel display screen 41 with reference to FIGS. 4A and 4B. In execution of the protocol prescribing the operation of sucking up the reagent 1a from the vessel 1A for injection into the empty vessel 4A and the subsequent operation of sucking up the reagent 1b from the vessel 1B for injection into the vessel 4A, the vessels and the operation contents related to the vessels are displayed on the vessel display screen 41 according to the sequence of execution of the protocol. FIG. 4A shows the case of sucking up the reagent 1a from the vessel 1A for injection into the vessel 4A, and FIG. 4B shows the case of sucking up the reagent 1b from the vessel 1B for injection into the vessel 4A. As shown in FIG. 4, since the vessels and the operation contents related to the vessels are displayed in a manner such that they can be identified even in process of execution of the protocol, it is possible to ascertain the synthesis operation easily.

Figure 5:
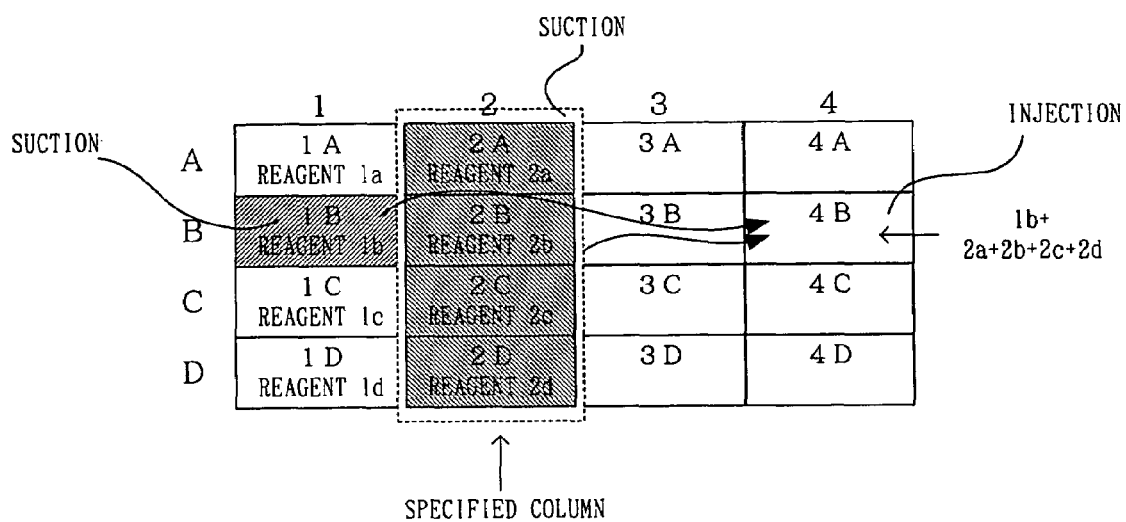
FIG. 5 is a view showing the vessel display screen in case of selecting a plurality of vessels in the specified column to carry out suction of reagents therein for injection into another vessel.

FIG. 5 shows a vessel display screen in case of selecting the vessels in the specified column to carry out suction of reagents therein for injection into another vessel.

On the vessel display screen 41, the operation of selecting the vessel 1B to carry out suction of the reagent 1b from the selected vessel 1B for injection into the vessel 4B is displayed, together with the operation of injecting the reagents 2a, 2b, 2c, 2d sucked from the selected vessels 2A, 2B, 2C, 2D in the specified second column into the vessel 4B. The vessel display screen 41 shows the selection of the vessels 1B, 2A, 2B, 2C, 2D and 4B by displaying these selected vessels in a manner such that they can be distinguished from the other. The vessel display screen 41 may show the operation contents related to the selected vessels by attaching to the selected vessels displayed a specific indication such as a color or a mark corresponding to the operations of suction and injection.

Figure 6:
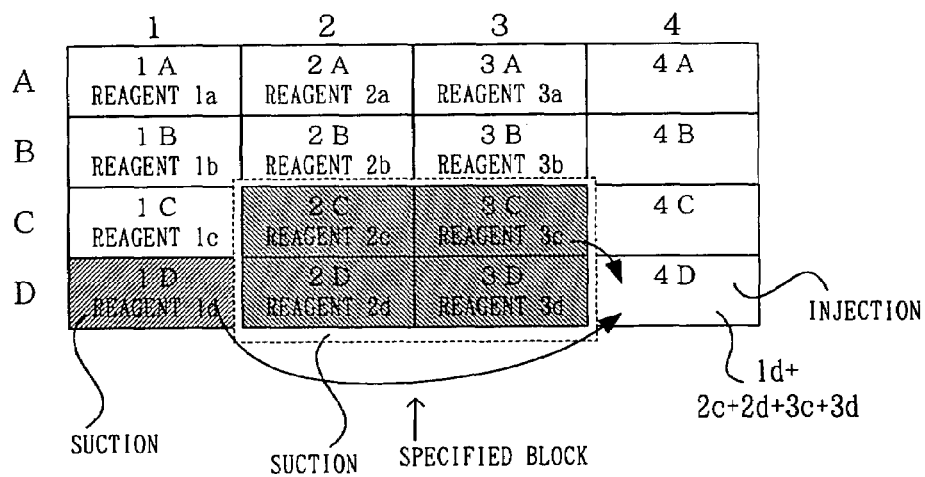
FIG. 6 is a view showing the vessel display screen in case of selecting a plurality of vessels in the specified block to carry out suction of reagents therein for injection into another vessel.

FIG. 6 shows a vessel display screen in case of selecting the vessels in the specified block to carry out suction of the reagent therein for injection into another vessel.

On the vessel display screen 41, the operation of selecting the vessel 1D to carry out suction of the reagent 1d from the selected vessel 1D for injection into the vessel 4D is displayed, together with the operation of injecting the reagents 2c, 2d, 3c, 3d sucked up from the selected vessels 2C, 2D, 3C, 3D in the specified block into the vessel 4D. The vessel display screen 41 shows selection of the vessels 1D, 2C, 2D, 3C, 3D and 4D by displaying these selected vessels in a manner such that the can be distinguished from the other. The vessel display screen may show the operation contents related to the selected vessels by attaching a specific indication such as a color or a mark corresponding to the operations of suction and injection.

Figure 7:
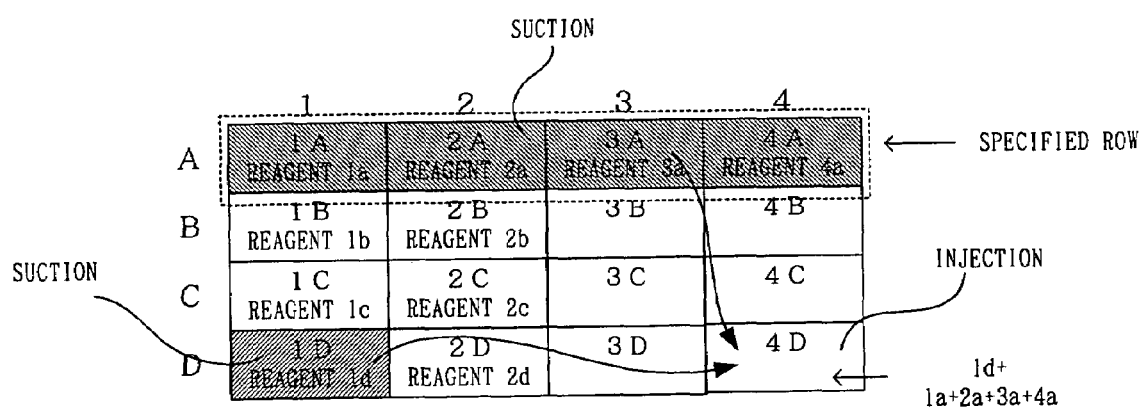
FIG. 7 is a view showing the vessel display screen in case of selecting a plurality of vessels in the specified row to carry out suction of reagents therein for injection into another vessel.

FIG. 7 shows a vessel display screen in case of selecting the vessels in the specified row to carry out suction of the reagent therein for injection into another vessel. Incidentally, in this case, the reagents 1a to 4a are stored in the vessels 1A to 4A in the A-th row.

On the vessel display screen 41, the operation of selecting the vessel 1D to carry out suction of the reagent 1d from the selected vessel 1D for injection into the vessel 3F is displayed, together with the operation of injecting the reagents 1a, 2a, 3a, 4a sucked up from the selected vessels 1A, 2A, 3A, 4A in the specified A-th row into the vessel 4D. The vessel display screen 41 shows selection of the vessels 1D, 1A to 4A and 4D by displaying these selected vessels in a manner such that the can be distinguished from the other. The vessel display screen may show the operation contents related to the selected vessels by attaching a specific indication such as a color or a mark corresponding to the operations of suction and injection.

As described above, according to the automatic synthesis machine according to the first embodiment of the present invention, a protocol can easily be created by the automatic synthesis machine. Further, it is possible to specify the vessels easily in the creation of the protocol, and also to ascertain the operation contents related to the specific vessels easily.

Second Embodiment

A description will now be given of the second embodiment of the present invention with reference to FIGS. 8 to 23.

Figure 8:
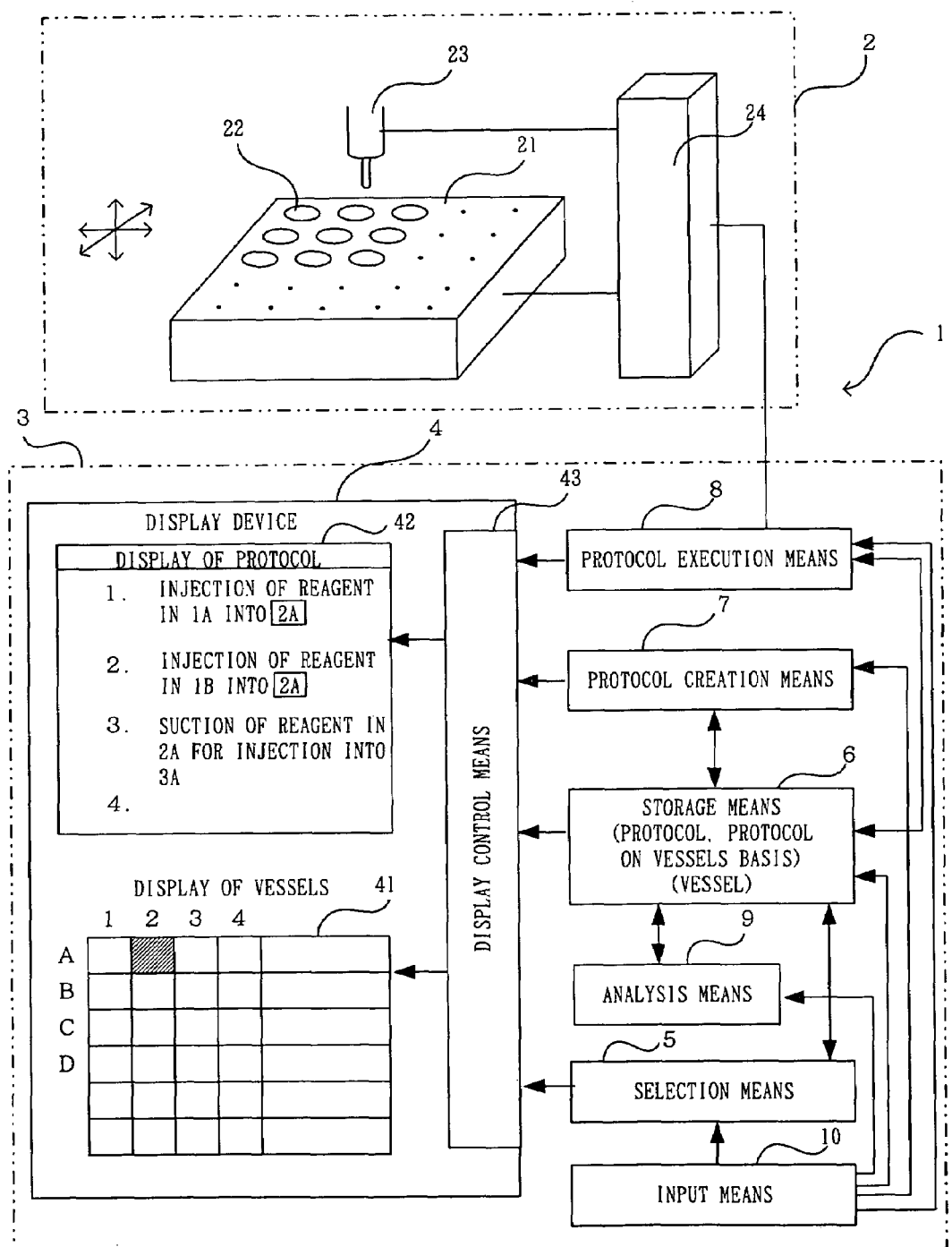
FIG. 8 is a view showing the outline of the second embodiment of an automatic synthesis machine according to the present invention.

FIG. 8 shows the outline of configuration of an automatic synthesis machine according to the second embodiment of the present invention. As shown in FIG. 8, an automatic synthesis machine 1 comprises a synthetic reaction device 2 for synthetic reaction and a control device 3, similarly to the automatic synthesis machine 1 (the first embodiment) shown in FIG. 1.

The synthetic reaction device 2 is similar in configuration to the synthetic reaction device 2 of the first embodiment and has the reactor 21, the vessels 22, the suction/injection means 23 and the drive control means 24 as shown in FIG. 1.

The control device 3 causes the synthesis reaction device 2 to carry out synthesis according to a protocol and also performs creation of the protocol. The control device 3 has the display device 4, the vessel selection means 5, the storage means 6, the protocol creation means 7, the protocol execution means 8 and the input means 10, similarly to the control device 3 of the first embodiment. However, the control device 3 of the second embodiment further has an analysis means 9, differently from the control device 3 in the first embodiment.

The display device 4 has the vessel display screen 41, the protocol display screen 42 and the display control means 43 similarly to the display device (the first embodiment) shown in FIG. 1.

In addition to the protocol, the result of analysis is displayed on the protocol display screen 42. On the protocol display screen 42 of FIG. 8, the protocol in process of creation is displayed. The first line of the protocol displayed on the screen shows a command to carry out suction of the reagent in the vessel 1A at the intersection of the A-th row and the first column for injection into the vessel 2A at the intersection of the A-th row and the second column, and the second line of the protocol shows a command to carry out suction of the reagent in the vessel 1B at the intersection of the B-th row and the first column for injection into the vessel 2A at the intersection of the Ath-row and the second column.

Further, the third line of the protocol shows a command to carry out suction of the reagent in the vessel 2A at the intersection of the Ath-row and the second column for injection into the vessel 3A at the intersection of the Ath-row and the third column.

Incidentally, in case of displaying the result of analysis by the analysis means 9 on the protocol display screen 42, only the result of analysis related to the selected vessels may be displayed, or the result of analysis related to all the vessels may be displayed in a lump.

The display control means 43 carries out display control of the vessel display screen 41 and the protocol display screen 42 based on data sent from the vessel selection means 5, the protocol creation means 7, the storage means 6 and the protocol execution means 8, which are described later.

The vessel selection means 5 is used for selecting a vessel for which an analysis is performed and also the vessel for which display of the result of analysis is performed, and the following three modes are available for selection of vessels.

(Vessel selection 1) Selection of the vessels is made based on input data from the input means 10. In this selection, a specific vessel is specified among the vessels displayed on the vessel display screen 41 by operation of the input means 10. Incidentally, the input means 10 may include a keyboard, a mouse, a digitizer, a tablet, a track ball, a joy stick or like pointing device.

(Vessel selection 2) Selection of the vessels is made based on data from the protocol creation means 7. In this case, a vessel is selected based on vessel data set in creation of a protocol by the protocol creation means 7. The vessel data for selection needs to be set in advance in the protocol creation means 7 through the input means 10. When the protocol creation means 7 picks out the vessel data set in process of protocol creation, it sends the data to the display control means 43.

The display control means 43 displays vessel-related data described in one line portion of the protocol on the vessel display screen 41 based on the above data.

The protocol creation means 7 performs the creation of the protocol and also displays the created protocol on the protocol display screen 42 on a line basis.

A protocol may be created by inputting data of vessels and operation contents related to the vessels using keys of the input means 10 or by operation of the pointing device of the input means 10 on the vessel display screen 41. The created protocol is stored in the storage means 6. Incidentally, in this case, an area for selection of the operation contents may be provided on the vessel display screen 41.

(Vessel selection 3) Selection of the vessels is made on the display device 4. In this case, selection is performed on the vessel display screen 41 or the protocol display screen 42.

Selection of the vessels on the vessel display screen 41 may be performed by specifying the vessel in need of ascertainment and verification among the vessels displayed on the vessel display screen 41. The selected vessel may be displayed on the vessel display screen 41. The vessel display screen 41 in FIG. 8 shows a case in which the vessel 2A is selected.

Selection of the vessel on the protocol display screen 42 may be performed by specifying the vessel in need of ascertainment and verification in the protocol displayed on the protocol display screen 42. The selected vessel is displayed on the vessel display screen 41. In FIG. 8, the vessel 2A is selected by specifying 2A described in the first or second line on the protocol display screen 42.

In display of the result of analysis, selection of vessels in units permits the result of analysis to be displayed for every vessel, while selection of all the vessels permits the result of analysis for all the vessels to be displayed in a lump.

The analysis means 9 analyzes the protocol stored in the storage means 6 to pick out the protocol line related to the vessel selected by the selection means 5. The picked-out line may be displayed on the protocol display screen 42 or outputted to an output device (not shown). Incidentally, the commands displayed on the protocol display screen 42 can be corrected and altered by the input means 10 and the protocol creation means 7.

After reading out the protocol stored in the storage means 6 in sequence, the protocol execution means 8 sends the read-out data to the drive control means 24. The drive control means 24 drives the reactor 21 and the suction/injection means 23 according to the sent protocol and carries out predetermined operations to produce a synthetic product. With the operation of the protocol execution means 8, the protocol may be displayed on the protocol display screen 42, and besides, the protocol line in process of execution may be also displayed thereon. At the same time, vessels and the operation contents related to the vessels, described in the protocol line in process of execution, may be also displayed on the protocol display screen 41.

Incidentally, data prescribing the layout of the vessel display screen 41 and the protocol display screen 42 may be stored in advance in a memory in the display control means 43 or the storage means 6.

A description will now be given of processes such as analysis of the protocol, selection of the vessel and picking-out of the operation contents related to the selected vessel, with reference to FIGS. 9 to 16.

Figure 9:
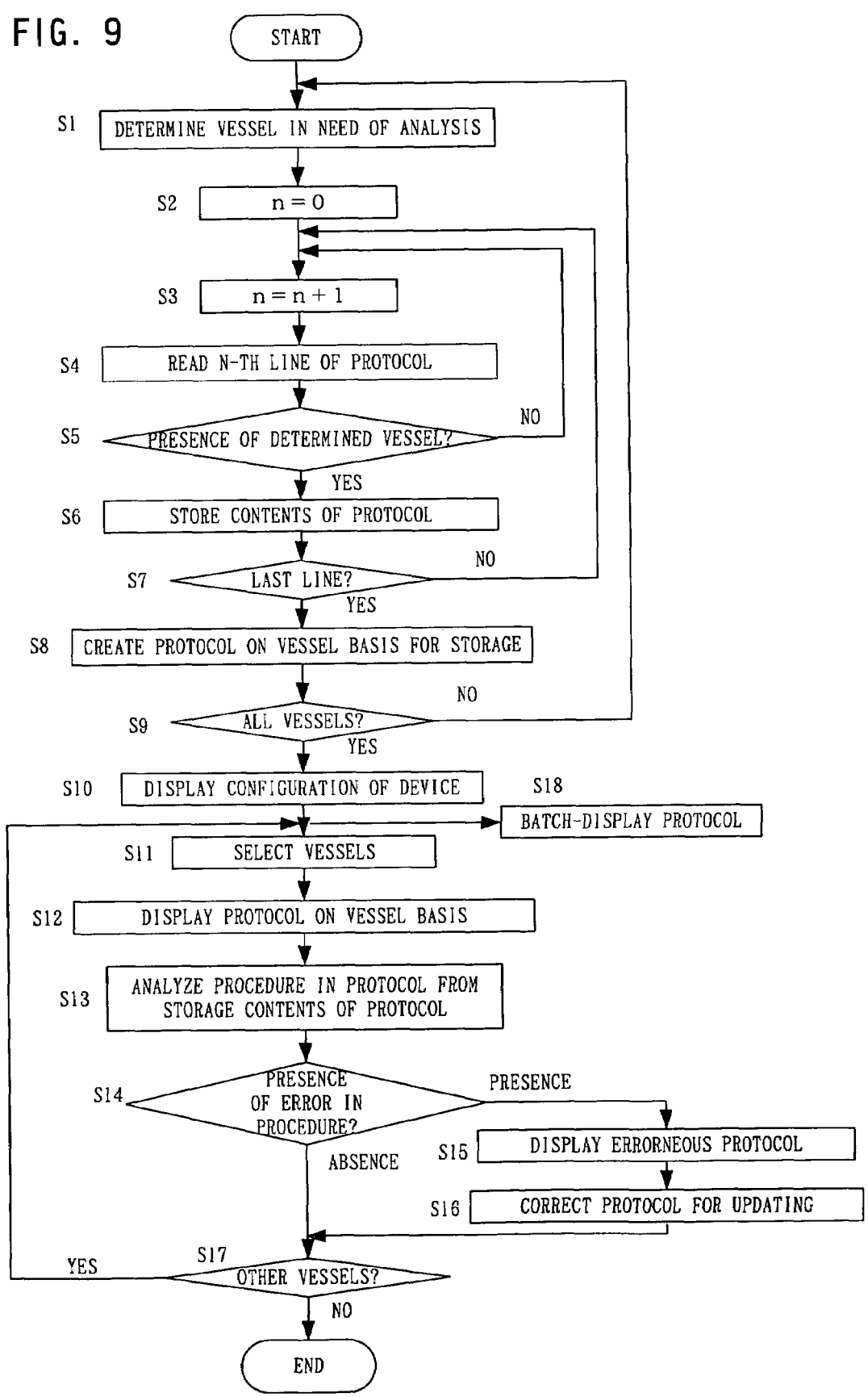
FIG. 9 is a flow chart for explaining the processes carried out by the automatic synthesis machine of FIG. 8 for selection of vessels, picking-out of the selected vessels and analysis of a protocol.

FIG. 9 is a flow chart for explaining the operations of analysis of the protocol, selection of the vessel and picking-out of the selected vessel. In the flow chart of FIG. 9, analysis of the protocol is carried out at Steps S1 to S10, and selection of a vessel and picking-out of commands related to the selected vessel is performed at Steps S11 to S18.

The analysis means 9 determines the vessel in need of analysis (Step S1), reads the protocol from the storage means 6 in sequence (Step S2 to S4) and then picks out the vessel determined in Step S1 from the read protocol line (Step S5). When the vessel as an object to be picked out is found in the read protocol line, the analysis means stores the contents of the protocol line in the storage means 6 (Step S6).

The analysis means 9 performs the processes of Steps S3 to S5 for all lines of the protocol (Step S7) and reforms the protocol into the operational procedure on a vessel basis. The content of the reformed protocol is store stored (Step S8). In the following, the analysis means 9 performs the processes of Steps S1 to S8 for all the vessels (Step S9).

Subsequently, the array of vessels is displayed on the vessel display screen 41 (Step S10). The operator selects a vessel with reference to the vessel display screen. Selection of the vessel may be performed by specifying the vessel displayed on the vessel display screen 41 or the protocol display screen 42 (Step S11).

When a vessel is selected, all the operation contents which are related to the selected vessel are picked out from the storage means 6, and the picked-out vessel is displayed in a a manner such that it can be identified on the vessel display screen 41, together with the operation contents related to the selected vessel (Step S12). Then, the analysis means 9 checks the operation contents related to the selected vessel (Step S13). If an error is found in the operation contents, the analysis means displays the message to the effect (Step S15). The command having an error is corrected by means of the input means 10 and the protocol creation means 7 (Step S16).

The above processes in Steps S11 to S16 may be performed for every selected vessel, permitting the procedure of chemical analysis to be ascertained and verified on a vessel basis (Step S17).

Incidentally, the vessel-basis operation contents analyzed by the processes in Steps S1 to S9 may be displayed in a lump for all the vessels without selecting any vessel (Step S18).

A description will now be given of the operation of the automatic synthesis machine according to the present invention. Producing of a compound using the reagents 1a to 1f stored in the vessels 1A to 1F will be described as an example in the following.

FIG. 10 shows one instance of a protocol. According to this protocol, synthesis is performed according to the different procedures using the reagents 1a to 1f and one product is produced in the vessel 4A producing the other product is produced in the vessel 4B. FIGS. 11 and 12 show the process carried out in the vessels for suction and injection of the reagents in case of producing the product in the vessel 4A. FIGS. 13 and 14 show the process carried out in the vessels for suction and injection of the reagents in case of producing the product in the vessel 4B.

In the process shown in FIG. 11, the reagents 1a, 1b stored in the vessels 1A, 1B are sucked up and then injected into the vessel 2A, where the reagents 1a and 1b are caused to react chemically to each other. Further, the reagents 1c, 1d stored in the vessels 1C, 1D are sucked up and then injected into the vessel 2B, where the reagents 1c and 1d are caused to react chemically to each other. Subsequently, the reactive products in the vessels 2A and 2B are sucked up and then injected into the vessel 3A, where they are caused to react chemically to each other.

Further, in the process shown in FIG. 12, the product in the vessel 3A and the reagent 1e in the vessel 1E are sucked up so that they are injected into the vessel 4A, where the reagent 1e and the product are caused to react chemically to each other.

The above procedures of synthesis are described in the commands of the first, third, fifth, seventh, ninth, eleventh, twelfth and fifteenth lines of the protocol in FIG. 10.

In the process shown in FIG. 13, the reagents 1a and 1c stored in the vessels 1A and 1C are sucked up so that they are injected into the vessel 2C, where the reagents 1a and 1c are caused to react chemically to each other. Then, the reagents 1b and 1d stored in the vessels 1B and 1D are sucked up so that they are injected into the vessel 2D, where the reagents 1b, 1d are caused to react chemically to each other. Subsequently, the reactive products in the vessels 2C and 2D are sucked up so that they are injected into the vessel 3B, where the products are caused to react chemically to each other.

Further, in the process shown in FIG. 14, the product in the vessel 3B and the reagent 1f in the vessel 1F are sucked up so that they are injected into the vessel 4B, where the regent 1f and the product are caused to react chemically to each other. The above procedures of synthesis are described in the commands of the second, fourth, sixth, eighth, tenth, thirteenth, fourteenth and sixteenth lines of the protocol in FIG. 10.

A description will now be given of case where a vessel is selected and commands related to the selected vessel is picked out from the above protocol, with reference to FIGS. 15 to 18.

FIGS. 15 and 17 show a vessel display screen for ascertaining and verifying the chemical synthesis related to the selected vessel 3A. In the automatic synthesis machine of the present invention, when the selecting means selects the vessel 3A, the analysis means picks out the commands related to the vessel 3A for display. FIG. 17 shows the commands related to the picked-out vessel 3A. Incidentally, the selected vessel 3A is framed as shown in FIG. 17. FIG. 15 shows that the vessels 2A and 2B are the sources of suction of reagents which are injected in the vessel 3A, and that the vessel 4A is the destination of injection of reagent which is sucked up from the vessel 3A. Incidentally, FIG. 15 also shows the vessel 1E is the source of suction of reagent which is injected in the vessel 4A.

FIGS. 16 and 18 show procedures in case of ascertaining and verifying the chemical synthesis related to the selected vessel 3B. In the automatic synthesis machine of the present invention, when the selection means selects the vessel 3B, the analysis means picks out the commands related to the vessel 3B for display. FIG. 18 shows the commands related to the picked-out vessel 3B. Incidentally, the selected vessel 3B is framed as shown in FIG. 18. FIG. 16 shows that the vessels 2C and 2D are the sources of suction of reagents which are injected in the vessel 3B, and that the vessel 3B is the destination of injection of reagent which is sucked up from the vessel 3B. Incidentally, FIG. 15 also shows the vessel 1F is the source of suction of reagent which is injected in the vessel 4B.

The chemical synthesis related to the selected vessel may be displayed in the form of commands picked out from the protocol as shown in FIGS. 17 and 18 or displayed on the vessel display screen 41 where selected vessels and their related vessels are shown as shown in FIGS. 15 and 16. Incidentally, arrows displayed on the screen in FIGS. 15 and 16 show the operational directions of suction and injection. Further, the operational directions may also be displayed on the display screen 41.

The analysis means may pick out all the vessels related to the product resulting from synthesis using the selected vessels, in addition to the vessel directly related to the selected vessels. FIGS. 19 and 20 show procedures in case of picking out all the related vessels.

When the vessel 3A is selected as shown in FIG. 17, the commands in the eleventh, twelfth and fifteenth lines are picked out. The picked-out command in the eleventh-line describes the vessel 2A as well as the vessel 3A, the picked-out command in the twelfth line describes the vessel 2B as well as the vessel 3A, and the picked-out command in the fifteenth line describes the vessel 4A as well as the vessel 3A. In this place, the analysis means picks out the commands in the first and third lines which are related to the vessel 2A, the commands in the fifth and seventh lines which are related to the vessel 2B and the command in the ninth line which are related to the vessel 4A. The analysis means then forms the protocol as shown in FIG. 22 by arranging the picked-out commands related to the vessel 3A.

Incidentally, the protocol shown in FIG. 20 may also be displayed on the vessel display screen 41.

A description will now be given of an embodiment in case of storing the reagents in a plurality of vessels with reference to FIGS. 21 to 23.

FIG. 21 shows the vessel display screen in case of storing the reagents in the plurality of columns of vessels. In FIG.

21, the vessels 1A to 1F in the first column are adapted to store the reagents 1a to 1f, while the vessels 2A to 2F in the second column are adapted to store the reagents 2a to 2f. Incidentally, the reagents may be stored in any of the columns of vessels.

The configuration of storing the reagents in the columns of vessels shown in FIG. 21 may be also similarly applied to storage of the reagents in the rows of vessels.

Further, storage of the reagents in one or more blocks of vessels is also applicable by selecting the vessels in blocks among the arrayed vessels, in addition to the storage of reagents in the vessels in rows or columns.

FIG. 22 shows the vessel display screen in case of storing reagents in the block of vessels.

Figure 23:
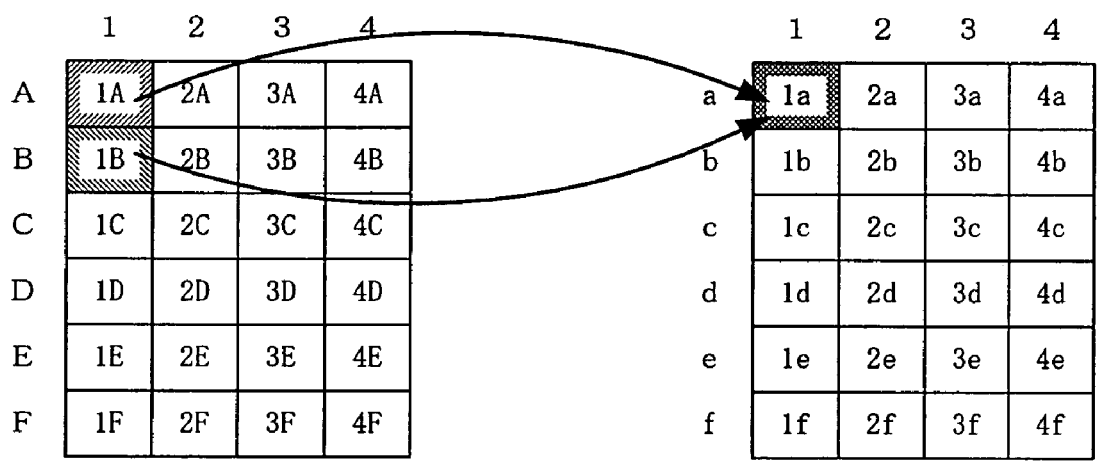
FIG. 23 is a view showing one embodiment in which an array of vessels for reagent and an array of vessels for reaction are provided.

FIG. 23 shows a case in which a plurality of vessel arrays, each composed of a plurality of vessels, are prepared one for storage of reagents while the other for reaction of reagents. In FIG. 23, the array of vessels for storage of reagents comprises the vessels 1A, 1F, 2A to 2F, 3A to 3F, 4A to 4F and 5A to 5F, and the reagent is stored in each vessel. The array of vessels for reaction of reagents comprises the vessels 1a to 1f, 2a to 2f, 3a to 3f, 4a to 4f and 5a to 5f, and the reagents are injected into the vessels to cause the reagents to react with each other.

As described above, according to the automatic synthesis machine according to the second embodiment of the present invention, it is possible to easily ascertain and verify the procedure of chemical synthesis related to each vessel which is carried out by the automatic synthesis machine.

What is claimed is:

1. A control device for an automatic synthesis machine, said control device comprising:
a display device for displaying at least a part of vessels housed in a reactor; and
a selection means for selecting one or more vessels among the vessels displayed on a screen of the display device,
wherein said display device is connected to a protocol creation means for creating a protocol prescribing the procedure of synthesis operation related to said vessels, and said selection means receives data related to the vessels set in creation of the protocol from said protocol creation means, causing the display device to display the selected vessels in a manner such that they can be identified on the screen from the non-selected vessels, together with the operation contents related to the selected vessels,
wherein the protocols include one of a reagent type and an operation type.

2. A control device for an automatic synthesis machine, said control device comprising:
a display device for displaying at least a part of vessels housed in a reactor; and
a selection means for selecting one or more vessels among the vessels displayed on a screen of the display device,
wherein said display device is connected to a storage means for storing a protocol prescribing a procedure of synthesis operation related to said vessels, and displays the stored protocol in said storage means on the screen for selection of one line of the displayed protocol by said selection means, causing the display device to display the selected vessels described in the selected protocol line in a manner such that they can be identified on the screen from the non-selected vessels, together with operation contents related to said selected vessels,
wherein the protocols include one of a reagent type and an operation type.

3. A control device for an automatic synthesis machine, comprising:
a display device for displaying at least a part of vessels housed in a reactor;
a selection means for selecting one or more vessels among the vessels displayed on a screen of the display device,
a storage means for storing protocols, and
a protocol execution means for executing at least one stored protocol,
wherein said display device is connected to said protocol execution means, and said protocol execution means reads out a protocol from said storage means one line at a time in sequence for execution, causing the display device to display the protocol line in process of execution on the screen, together with the vessels described in said protocol line and operation contents related to said vessels in a manner such that the described vessels can be identified on the screen from the non-described vessels,
wherein the protocols include one of a reagent type and an operation type.

4. An automatic synthesis machine for automatic synthesis of compounds by allowing reagents to chemically react with each other, comprising:
a plurality of vessels for use in synthesis of compounds;
a selection means for selecting a specific vessel among said plurality of vessels;
an analysis means for analyzing a protocol prescribing a series of commands for synthesis of compounds, picking out commands related to the selected vessel from said protocol and checking said commands for errors; and
a protocol execution means for executing the analyzed protocol;
wherein the protocols include one of a reagent type and an operation type.

5. A control device used for an automatic synthesis machine to drive a suction/injection unit for suction or injection of reagents in vessels housed in a reactor, said control device comprising:
a display means having display screens;
a protocol creation means for creating a protocol;
a storage means for storing the protocol;
a selection means for selecting the vessel; and
a protocol line analysis means for picking out all the operation contents related to the vessel selected by said selection means from the protocol stored in said storage means to create the operational procedure related to the selected vessel, checking said operation contents for errors, causing the storage device to store the contents of the operational procedure and also causing said display device to display them on the screen;
wherein the protocols include one of a reagent type and an operation type.

* * * * *